UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF OBTAINING MEAT EXTRACTS.

SPECIFICATION forming part of Letters Patent No. 438,333, dated October 14, 1890.

Application filed May 16, 1890. Serial No. 352,077. (No specimens.)

*To all whom it may concern:*

Be it known that I, JOSEPH VAN RUYMBEKE, a subject of the King of Belgium, residing at Chicago, in the county of Cook and State of Illinois, have invented a certain new and useful Improvement in the Process of Obtaining Meat Extracts, which is fully set forth in the following specification.

Heretofore the liquor or soup obtained by the boiling of preserved salted meats preparatory to canning has been considered of no value and has been treated as a waste by-product. The fats, salt, saltpeter, sugar, excessive glutine, and fibrous particles which such liquor contains render it unsuitable as an article of food, and about the only utilization heretofore effected has been simply to chill the liquor for the purpose of collecting the grease contained therein, the liquid being then run off as waste material. In my varied experiments with this liquor I have discovered that it contains liquid extract of meat, which, separated from the objectionable elements of the liquor and sufficiently concentrated, constitutes a very desirable food, either as a soup or as concentrated meat extract. The salt and saltpeter contained in this liquor have sometimes been separated by concentrating the liquid until the salts crystallize out; but in this operation the sugar, which is also present in the liquid, is partly caramelized, and at the same time some of the ingredients of the meat extract are affected by the reaction of the saltpeter and yield products of oxidation very bitter in taste, so that the extract resulting from this treatment is unsuitable for general use. I have also discovered that these soup-waters, even if filtered absolutely clear as they come from the cooking-vats, will yield on evaporation a liquid containing a large percentage of insoluble organic matter, which renders the product muddy, and which it is most desirable should be removed before final concentration. In a prior application, Serial No. 329,557, I have set forth one process for recovering this liquid meat extract from the soup-liquors referred to, which are obtained by the boiling of preserved salted meats.

My present invention relates to another process for accomplishing substantially the same result, and may be designated, in general terms, an evaporating, filtering, and settling process, the several steps of which I will proceed to describe.

In the treatment of the soup-water under my present process the liquor is not allowed to cool, but is kept hot by being conveyed directly from the cooking-vats into a steam-jacketed or coiled tank, whereby it is still kept hot, and the grease or fats will come to the surface and are removed by skimming or any other suitable way. The coarse meaty particles are then separated from the hot liquid by straining, filtering, or other like treatment. The resultant strained liquid is still kept hot, and while in this state is concentrated by evaporation. I have discovered that this liquid may be concentrated to a gravity of about 23° Baumé (measured hot) without difficulty or objection under a very light vacuum or even at atmospheric pressure; but in order to produce a further concentration and simultaneous crystallization of the salts without injury to the meat extract it is necessary to carry on the evaporation under a high vacuum—say from 10° upward—the higher the vacuum the better the results. So I first concentrate the liquid to about 23° Baumé under a light vacuum, as suggested above. I then filter the liquid again while still hot, and then still further concentrate this filtered liquid by evaporation under a high vacuum until about one-half of the salt crystallizes out, and then the fluid, which is a mixture of liquid meat extract and crystallized salt, is allowed to stand and settle and the little remaining organic matter will be readily deposited with the salt. The clear liquid is decanted off. If the salts in the liquid are not yet sufficiently removed, this clear liquid may then be further concentrated by evaporation under a high vacuum, and the salt still further crystallized by this process. When the liquid is again allowed to stand and settle, the crystallized salts will be precipitated, and, after cooling, the clear liquid above may be decanted off and will be a good merchantable article of meat extract.

Sometimes the second step in concentration by evaporating under a high vacuum may be prosecuted immediately after the first concentration to a gravity of about 23° Baumé without the intermediate filtration, the liquid being cleared entirely by crystallization and settling; but this will be accompanied by a larger loss of the extract in the course of evaporation, and sometimes filtration alone may be used at this stage of the process when an absolutely clear product is not required; but the best results are obtained by employing all the steps in the process, as described above, and in carrying out this said process I prefer to have at least two evaporations under a high vacuum, the first being continued until about one-half the salts contained crystallize, the remainder, or so much thereof as it is necessary to remove, being left for the second evaporation of the decanted liquor obtained from the first. The process may, however, be ended with a single evaporation under a high vacuum.

The keeping of the liquor hot from the boiling-tanks all through the early steps of the process, as described above, is of very great importance, for it prevents the souring of the liquor, which results if it is allowed to become cold soon after removal from the boiling-tanks and which unfavorably affects the quality of the final product.

Having thus described my invention, what I claim as new, and desire to secure by Letters Patent, is—

The herein-described process for obtaining meat extract from soup-waters resulting from boiling salt meats, the same consisting in the following steps: first, removing the fats by skimming while the liquid is kept hot as it comes from the boiling-tanks; second, straining or filtering this hot liquid; third, concentrating by evaporation under a low vacuum to about 23° Baumé, (measured hot;) fourth, concentrating, either with or without previous filtering, under a high vacuum to produce crystallization of the salts, and, fifth, settling and decanting, substantially as set forth.

JOSEPH VAN RUYMBEKE.

Witnesses:
  CARRIE FEIGEL,
  A. M. BEST.